United States Patent [19]
Lovitz

[11] 3,747,566
[45] July 24, 1973

[54] TURTLE TANK
[75] Inventor: David D. Lovitz, Short Hills, N.J.
[73] Assignee: Sternco Industries, Inc., Harrison, N.J.
[22] Filed: Dec. 22, 1971
[21] Appl. No.: 210,917

[52] U.S. Cl. ................................................ 119/5
[51] Int. Cl. .......................................... A01k 64/00
[58] Field of Search ...................... 119/5; 43/56, 57

[56] References Cited
UNITED STATES PATENTS

| | | | |
|---|---|---|---|
| 1,634,305 | 7/1927 | Schrimp | 119/5 |
| 3,141,442 | 7/1964 | Harris | 119/5 |
| 1,419,549 | 6/1922 | Fearnow | 119/5 |
| 2,628,447 | 2/1953 | Brown | 119/5 X |
| 3,323,249 | 6/1967 | Randall | 43/57 |
| 2,871,820 | 2/1959 | Hayden | 119/5 |
| 1,616,125 | 2/1927 | Holman | 119/5 X |
| 3,490,416 | 1/1970 | Kelly et al. | 119/5 |

Primary Examiner—Louis G. Mancene
Assistant Examiner—James H. Czerwonky
Attorney—Emanuel R. Posnack

[57] ABSTRACT

A turtle tank adapted for sanitary maintenance, ready cleansing and turtle washing without manually handling and removing the turtles from the tank. An inner tank component for housing turtles is separably nested in a lower outer tank component, said inner component having a floor with perforations and with an elevated island extending above the water level, said floor being positioned above the floor of the lower outer component to provide a base upon which sediment particles and other refuse are deposited by the downward flow of soiled water through said perforations. The said tank components both have outwardly extending flanged peripheries for manual grasping, the flanged periphery of the inner component overlapping and extending outwardly beyond the flanged periphery of the outer component, thereby to facilitate the operative lifting of the inner component with the turtles therein for effecting a drainage of said latter component, the flushing thereof with water and the washing of the turtles.

1 Claim, 7 Drawing Figures

PATENTED JUL 24 1973

TURTLE TANK

BACKGROUND OF THE INVENTION

1. The Field of the Invention

This invention relates to turtle tanks, particularly to small turtle display tanks for home use.

2. The Known Art

Tanks for housing and displaying pet turtles are widely used, such tanks containing water at a predetermined level and having an elevated portion or "island" extending up from the floor above the water level for accomodating the turtles when they are not in the water for feeding or other purposes. Frequent cleansing of the tank is necessary because of the accumulation of turtle droppings and other debris which cause a stench and result in stagnant, polluted and often disease-ridden water; and it is also equally necessary to wash the turtles that have been wallowing in the water. The cleansing and washing operations are difficult and messy tasks, requiring the handling of the turtles to remove them from the tank in order effectively to wash them and cleanse the tank.

OBJECTIVES OF THE INVENTION

It is the objective of this invention to provide a turtle tank of the aforesaid category having none of the above-mentioned shortcomings of conventional tanks. Among the specific objects are the provision of a tank device having means for maintaining it in a sanitary condition, that is readily cleanable without the need to handle or remove the turtles, that enables the turtles to be washed while positioned in a component part of the tank, that requires no special skill in the cleansing and washing operations even to the extent that such operations can be performed by a child, and that is of simple and inexpensive construction.

Other objects, features and advantages will appear from the drawings and the description hereafter given.

SUMMARY OF THE INVENTION

In the preferred form of this invention, two tank components in separable nested relation are employed, the inner tank component — for housing the turtles — having a perforated floor with an elevated portion or "island" extending above the tank's predetermined water level, both tank components having peripheral portions for manual grasping. In said preferred embodiment the floors of the two components are in spaced relation, thereby providing a shallow base compartment into which a substantial portion of sedimented and polluted water drains, said base compartment being separated from the turtles' upper living compartment. The said peripheral portions of the two tank components are preferably outwardly flanged, the flanged periphery of the said inner component overlapping and extending outwardly beyond the flanged periphery of said outer component, whereby the periphery of the inner component can be readily manually grasped to lift the latter component upwardly and thereby separate it from the lower component.

The arrangement is such that while the inner component is being slidably lifted upwardly all its water drains into the lower outer component, the turtles in the inner tank component remaining therein while the latter component is taken to a sink and held under the faucet for cleansing and at the same time washing the turtles. The said outer component is independently cleansed, and then refilled to a marked level. The two cleansed tank components are then re-assembled, the water entering the inner tank component through its perforated floor — the turtles at all times being free of handling and remaining in place undisturbed.

DESCRIPTION OF THE PREFERRED EMBODIMENT

Figure 1:
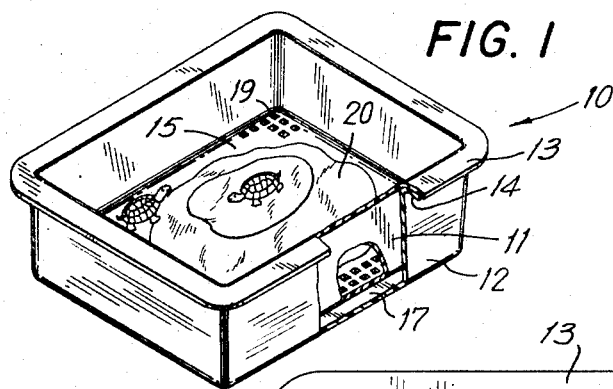
FIG. 1 is a perspective view of a turtle tank according to a preferred embodiment of this invention, fragments being removed for clarity, two turtles being shown in place, water being omitted.
Figure 2:
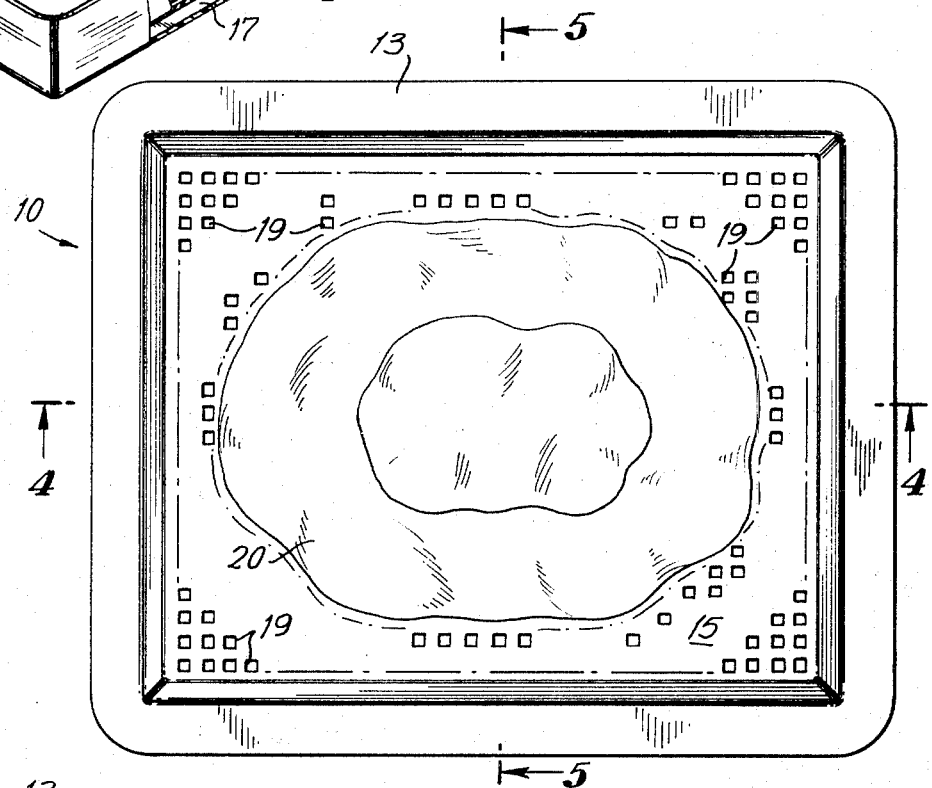
FIG. 2 is a top plan view of FIG. 1.
Figure 3:
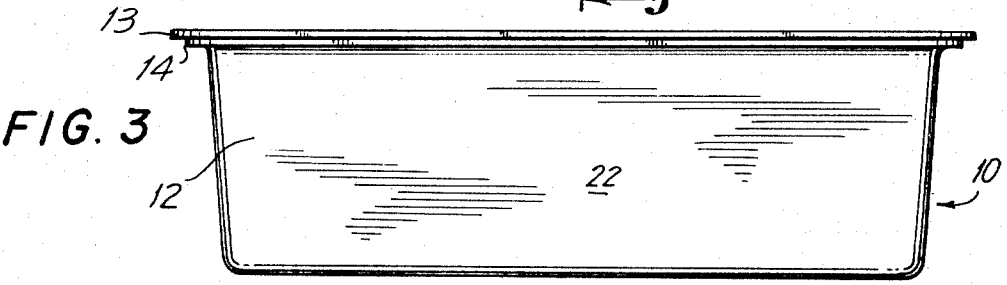
FIG. 3 is a front view of FIG. 1.
Figure 4:
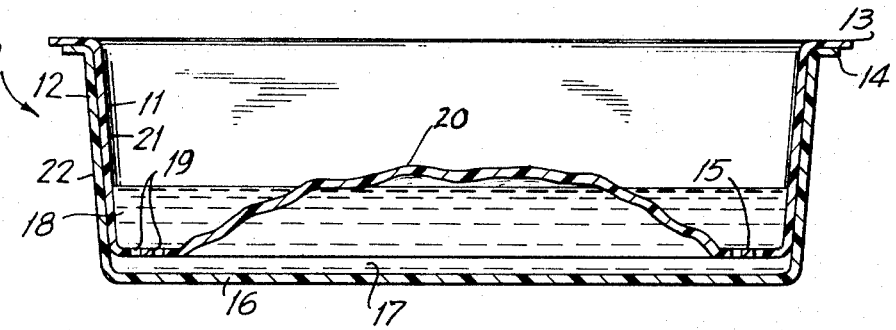
FIG. 4 is a section of FIG. 2 taken along line 4—4.
Figure 5:
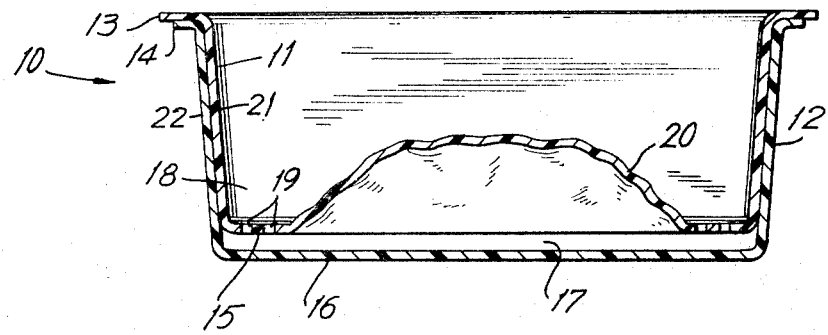
FIG. 5 is a section of FIG. 2 taken along line 5—5.

In the preferred embodiment illustrated in the drawings, the turtle tank generally designated 10 comprises the inner upper component 11 separably nested into the outer lower component 12, the flanged periphery 13 of the former overlapping and extending outwardly beyond the flanged periphery 14 of the latter. The said inner component is for housing turtles, the said outer component being adapted to support said inner component. In the form of this invention illustrated, the flanged periphery 13 rests upon the flanged periphery 14 (see FIGS. 4 and 5), the proportions of the two said components being such that the floor 15 of the inner component 11 is spaced above the floor 16 of the outer component 12 to form the base compartment 17 separated from the turtles' living compartment 18 by said floor 15. The latter floor is perforated, the perforations 19 thereof communicating between said compartments 17 and 18. The floor 15 of the inner component has the elevated portion or island 20 upon which the turtles rest when not in the water.

Figure 7:
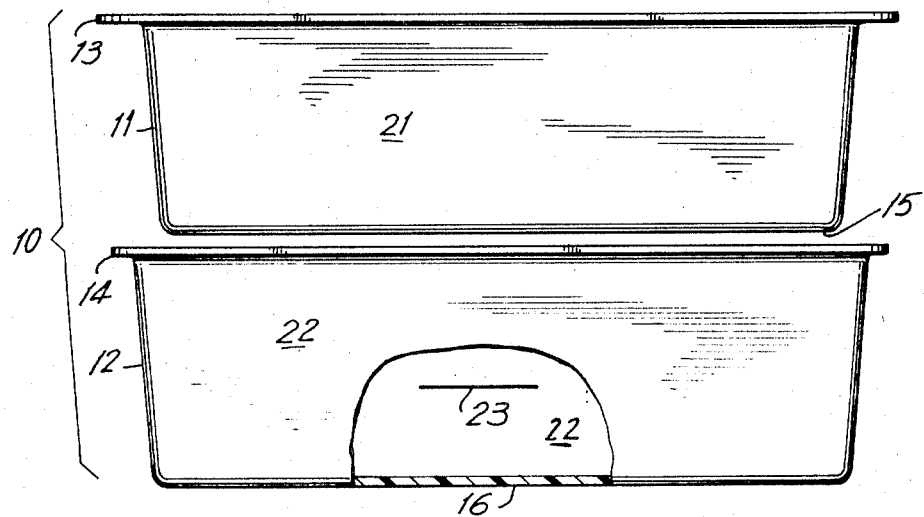
FIG. 7 is a disassembled front elevational view of the two tank components, the outer component having a portion broken away to show the water level mark therein.

The lateral walls 21 and 22 of the respective inner and outer tank components are preferably in slidable engagement to prevent relative lateral movement of said components when in assembled relation and to permit their operative guided separation and reassembly. The said outer component 12 contains on the inner surface of the lateral wall 22 the water level marking 23 (FIG. 7) for indicating the predetermined optimum water level for this device, said level being below the upper portion of said island 20.

In the operative use of this device, the outer tank component 12 is first filled with water up to the level 23, whereafter the inner tank component 11 is operatively inserted into said outer component. The small turtles within the inner component will assume suitable positions therein. When floatable food is deposited within the inner tank, the turtles will enter the water naturally to feed thereupon. When they desire to leave the water for warmth or other purposes, they move to the said island 20.

Sediment particles and the small droppings of the turtles will gravitationally drain downwardly through the said perforations 19 of flow 15 into the said base compartment 17, substantially clearing the water above the floor 15 from pollution.

Figure 6:
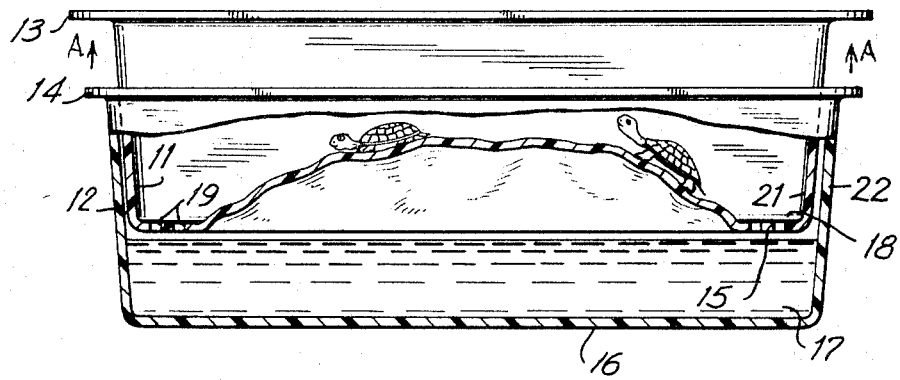
FIG. 6 is a front elevational view, partly in section, of the inner and outer components while the inner component is being operatively lifted from the outer component, turtles being shown in the upper inner component, and water drained from the inner component being shown in the lower output component.

In the operations of cleansing the said tank components and washing the turtles, the flanged periphery 13 of the inner component is manually grasped and lifted upwardly in the direction of arrows A—A (FIG. 6), the grasping of said periphery 13 being readily accomplished since it extends outwardly beyond the flanged periphery 14 of the outer component. As component 11 is being lifted, with the turtles therein, said component drains downwardly into the lower outer component 12. The said inner tank component 11 is then carried to a sink and placed under an open faucet to clean the tank member and wash the turtles — the outer tank component 12 being similarly brought to the sink and cleansed, whereafter it is filled with clean water up to said mark 23 and the two tank components reassembled in the manner above described.

The entire tank unit of this invention can thus be maintained in a sanitary condition at all times, the cleansing and washing operations being simple and requiring no messy handling of the turtles.

In the above description, the invention has been disclosed merely by way of example and in preferred manner; but obviously many variations and modifications may be made therein. It is to be understood, therefore, that the invention is not limited to any particular form or manner of practicing same.

I claim:
1. A turtle tank comprising two tank components in separable nested relation, one being an inner component for housing turtles and the other being an outer component for supporting said inner component, each of said components having lateral walls, a floor and a peripheral portion for manual grasping, the floor of said inner component having perforations therein and an elevated island extending above a predetermined tank water level, the floor of said inner component being positioned above the floor of the outer component to provide a base for receiving debris gravitationally flowing downwardly through said perforations, said floors being in spaced relation to provide a base compartment between said floors for receiving debris-laden water gravitationally flowing downwardly through said perforations, said respective peripheral portions having outwardly extending flanges, the peripheral flange of the said inner tank component being in overlapping engagement with the peripheral flange of said outer tank component, the proportions of said components and flanges being such that when said flanges are in operative engagement the said floors will be in said spaced relation, the said lateral walls of said inner component extending upwardly from the floor of said inner component to a level above that of said elevated island and being in slidable engagement with the said lateral walls of said outer component, thereby to effect a guided engagement of said walls during the operative separation and re-assembly of said components and to prevent relative lateral movements of said components when in assembled relation.

* * * * *